W. F. WOCHER, R. L. LEMON & L. H. MORTSOLF.
SAFETY ELECTRICAL CIRCUIT BREAKER.
APPLICATION FILED NOV. 30, 1908.
941,002.
Patented Nov. 23, 1909.
3 SHEETS—SHEET 1.
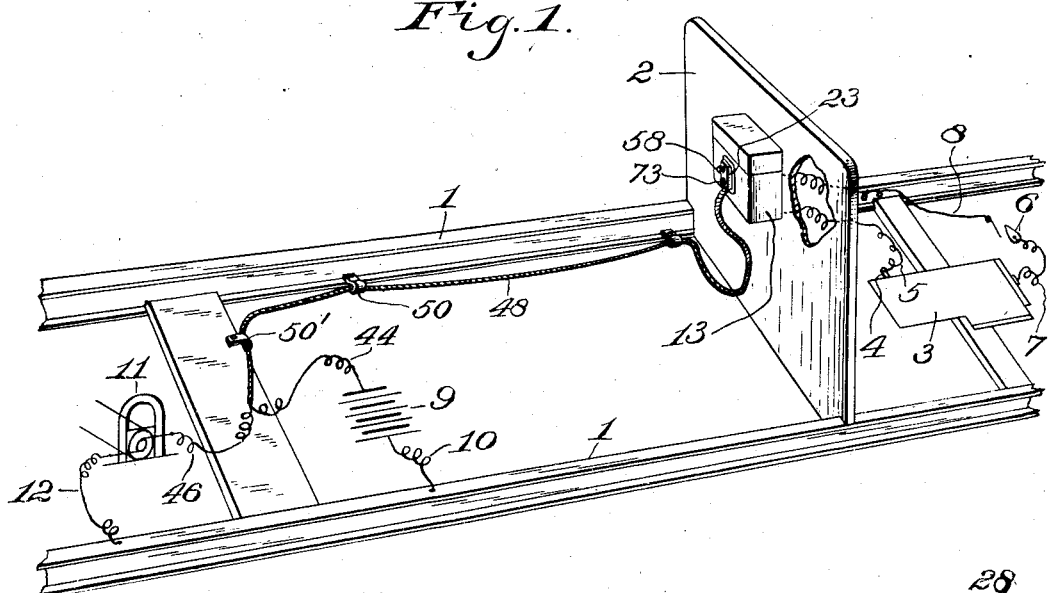
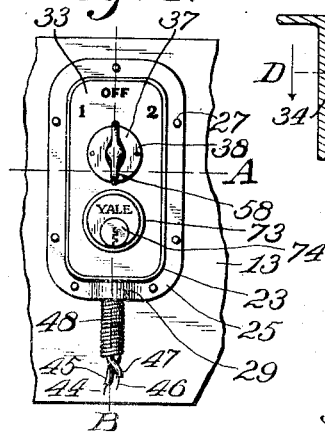
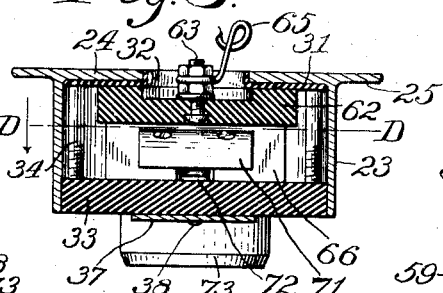
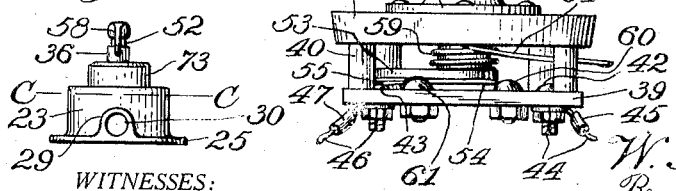
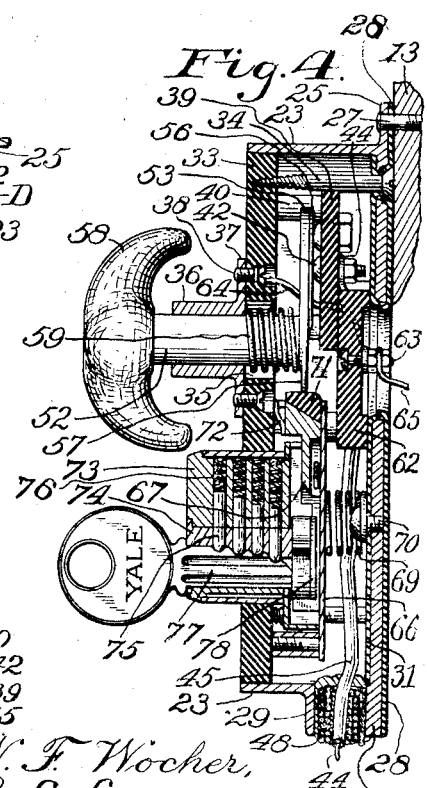
WITNESSES:
J. H. Gardner
K. R. Woddell
W. F. Wocher,
R. L. Lemon,
L. H. Mortsolf,
Inventors.
BY E. T. Silvius,
ATTORNEY.

W. F. WOCHER, R. L. LEMON & L. H. MORTSOLF.
SAFETY ELECTRICAL CIRCUIT BREAKER.
APPLICATION FILED NOV. 30, 1908.
941,002.
Patented Nov. 23, 1909.
3 SHEETS—SHEET 2.
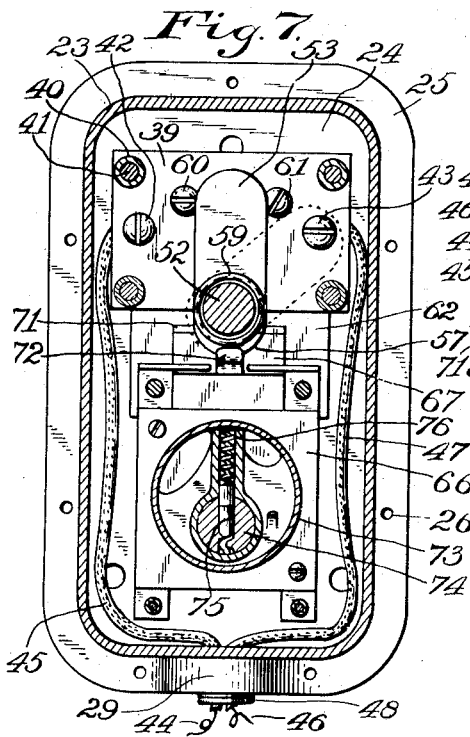
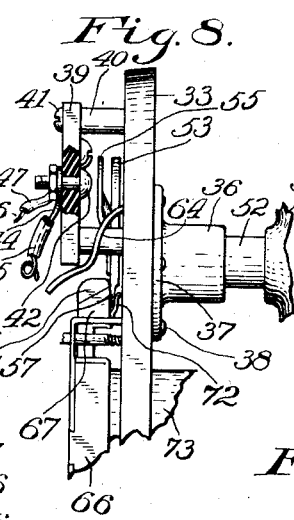
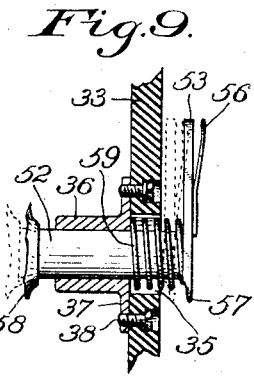
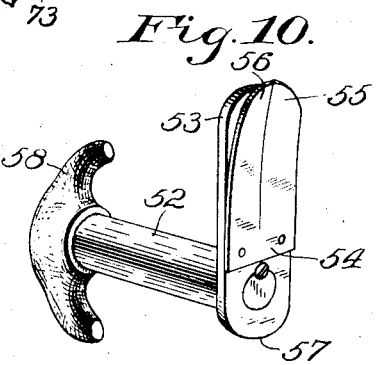
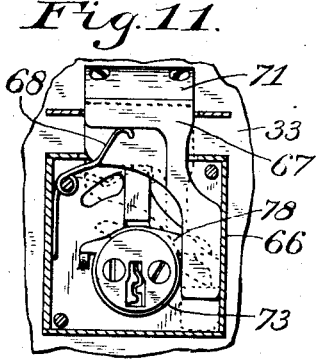
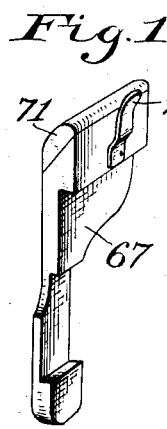
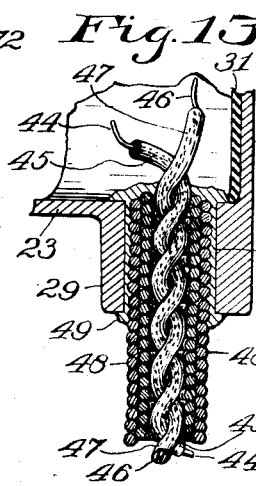
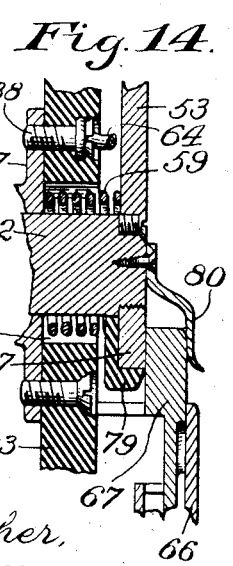
WITNESSES:
J. H. Gardner
H. R. Woddell.
W. F. Wocher,
R. L. Lemon,
L. H. Mortsolf,
BY  Inventors.
E. T. Silvius,
ATTORNEY.

W. F. WOCHER, R. L. LEMON & L. H. MORTSOLF.
SAFETY ELECTRICAL CIRCUIT BREAKER.
APPLICATION FILED NOV. 30, 1908.
941,002.
Patented Nov. 23, 1909.
3 SHEETS—SHEET 3.
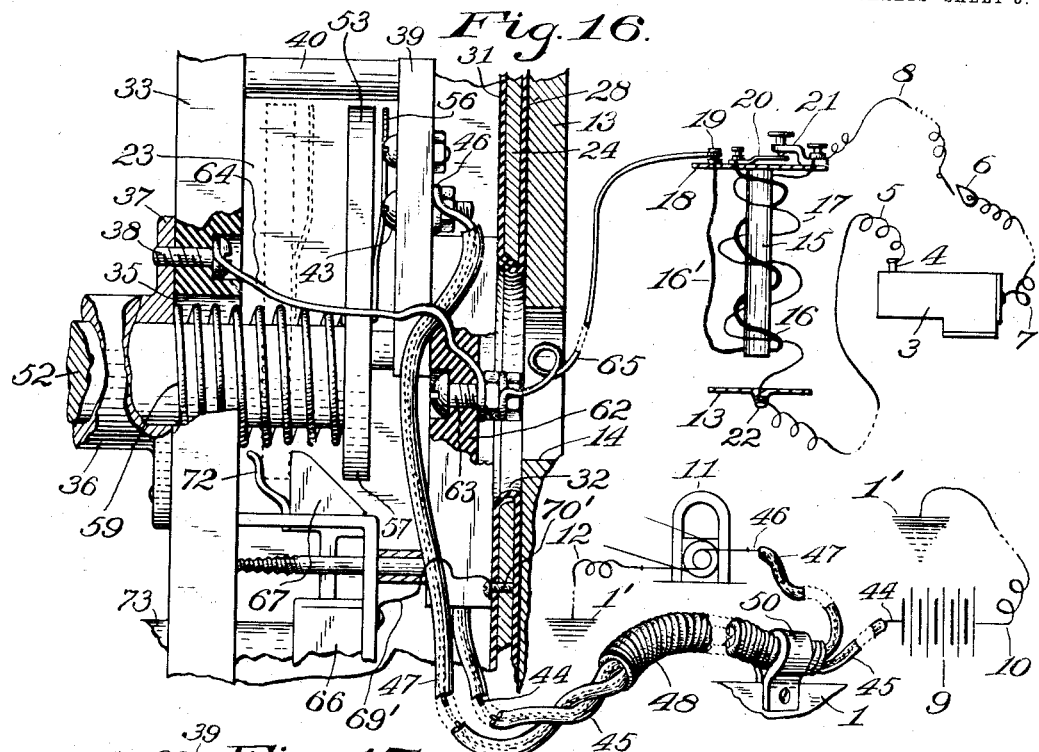
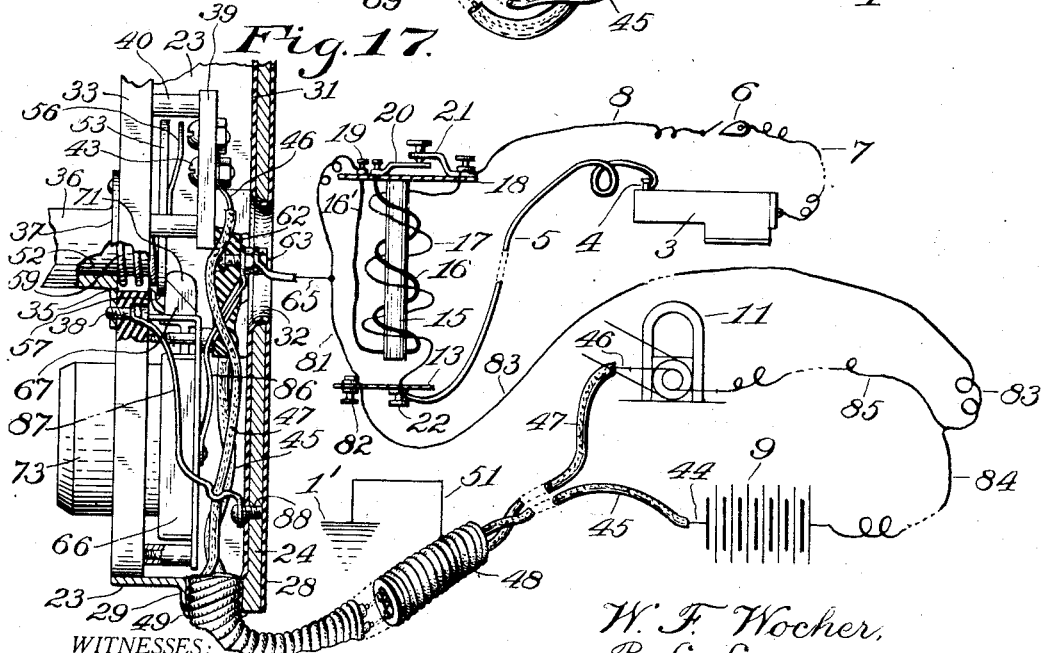
WITNESSES:
J. H. Gardner
K. R. Woddell
W. F. Wocher,
R. L. Lemon,
L. H. Mortsolf, Inventors
BY E. T. Silvius,
ATTORNEY.

UNITED STATES PATENT OFFICE.

WILLIAM F. WOCHER, ROBERT L. LEMON, AND LOUIS H. MORTSOLF, OF INDIANAPOLIS, INDIANA.

SAFETY ELECTRICAL-CIRCUIT BREAKER.

941,002.      Specification of Letters Patent.      Patented Nov. 23, 1909.

Application filed November 30, 1908. Serial No. 465,383.

*To all whom it may concern:*

Be it known that we, WILLIAM F. WOCHER, ROBERT L. LEMON, and LOUIS H. MORTSOLF, citizens of the United States, residing at Indianapolis, in the county of Marion and State of Indiana, have invented certain new and useful Improvements in Safety Electrical-Circuit Breakers; and we do declare the following to be a full, clear, and exact description of the invention, reference being had to the accompanying drawings, and to the figures of reference marked thereon, which form a part of this specification.

This invention relates to the class of electrical circuit breakers that are designed to prevent the connecting or making of the electrical circuits by unauthorized persons, the invention having reference more particularly to devices whereby when the circuits are broken grounding also will automatically occur; and the invention relates also to improved grounding systems and apparatus in electrical circuit-breakers, especially in relation to sparking circuits of explosive engines, particularly automobile engines.

Objects of the invention are to improve and simplify the construction of safety electrical circuit-breakers in order to cheapen production and improve the efficiency thereof, and to provide safety electrical circuit-breakers for various systems of electrical wiring.

The present invention consists in a circuit-breaker or interrupter comprising essentially a lock-bolt adapted to be locked when advanced and to act to ground the electrical circuit; the invention consisting further in an improved flexible connection between the circuit-breaker casing or housing and the ground to defeat attempts to restore the circuits; and, the invention consists also in the novel parts, and in the combinations and arrangements of parts as hereinafter particularly described and then defined in the accompanying claims.

Referring to the drawings Figure 1 is a fragmentary perspective view of an automobile frame having the improvements connected therewith; Fig. 2, a fragmentary front elevation of the spark-coil box and the improved circuit breaker and switch combined; Fig. 3, a horizontal sectional view at the plane of the line A in Fig. 2; Fig. 4, a vertical sectional view at the plane of the line B in Fig. 2; Fig. 5, an end elevation of the circuit-breaker and switch combined; Fig. 6, a fragmentary upper end view of portions of the improvements showing particularly the switch apparatus; Fig. 7, a sectional view approximately on the line C C in Fig. 5; Fig. 8, a fragmentary side view of a portion of the apparatus; Fig. 9, a fragmentary sectional view approximately on the line B in Fig. 2; Fig. 10, a perspective view of connected operating parts of the circuit breaker and switch; Fig. 11, a fragmentary sectional view approximately at the plane of the line D D in Fig. 3; Fig. 12, a perspective view of the improved lock bolt preferably employed in the improved apparatus; Fig. 13, a fragmentary sectional view approximately at the plane of the line B in Fig. 2; Fig. 14, a fragmentary sectional view of a modified construction as at the plane of the line B in Fig. 2; Fig. 15, a transverse section of incased circuit wires; Fig. 16, a fragmentary sectional elevation and diagrams illustrating modifications and a wiring system; and Fig. 17 a fragmentary sectional elevation diagrammatically illustrating a modification in a wiring system and modifications in the wiring for the improved circuit-breaker.

Similar reference characters throughout the drawings indicate corresponding elements or features of construction referred to herein.

The invention is illustrated in connection with an automobile having an explosive engine in order that the arrangement and functions of the apparatus may be clearly understood, but the invention is not limited to sparking circuits and may be otherwise arranged, the preferred construction and arrangement being first described.

In the drawings the numeral 1 indicates an automobile frame which for the purpose of the invention serves as the ground connection, 1' indicating the ground or equivalent of the frame 1 for practical purposes; 2 indicates the dash-board of the automobile; 3, a symbol indicating any suitable explosive engine, and 4 the spark-plug thereof connected by a wire 5 with a spark-coil as usual; 6, a make and break device or timer connected by a wire 7 with the engine, there being a circuit wire 8 leading from the timer or make and break device to the spark coil as usual; 9 a sparking battery connected by a circuit wire 10 with the frame 1 or the ground; and 11 a magneto connected by a circuit-wire 12 with the frame or ground. The spark coil as usual is inclosed in a spark coil box 13 that is mounted on the dashboard 2 and having an aperture 14 in its front. The spark-coil as will be understood comprises a core 15, primary winding 16 and secondary winding or induction-coil 17, a frame member 18 on which is a binding post 19, a vibrator 20 and a contact device 21 for the vibrator. The bottom of the spark-coil box 13 has a binding post 22 mounted thereon. The afore-mentioned features will be readily understood without further description.

The apparatus comprising parts of the invention includes a casing or housing 23 formed of suitable metal and having a back 24 and a laterally extending flange 25 having apertures 26 therein for securing the casing to the front of the spark-coil box 13 by suitable devices 27 that will prevent the removal of the casing by ordinary means, there being preferably a sheet of insulating material 28 between the back of the casing and the front of the spark-coil box, the insulation being necessary if the spark-coil box is metallic, but unnecessary if it be wooden. The casing 23 has a boss 29 on the lower end thereof in which is an opening 30 through which wires may extend. A sheet of insulating material 31 is placed against the inner side of the back 24 and the back has an aperture 32 therein, as have also the sheets of insulating material. The casing includes also a front 33 which is composed of insulating material such as hard rubber, the front being securely fastened in the forward portion of the casing 23 opposite to the back 24 by suitable means, such as screws 34 extending from the back into said front, so as to be inaccessible from the exterior. The front has an aperture 35 therein and on the exterior of the front is a hollow circular guide 36 having a flange 37 into which screws 38 are inserted through the front 33 from the inner side thereof, so as to be inaccessible from the exterior. A frame plate 39 composed of insulating material such as vulcanized fiber is mounted on the front 33 by means of hollow posts 40 and securing screws 41 extending through the posts. Two contact devices 42 and 43 are mounted on and extend through the plate 39 and are in the form of binding screws having their heads on the side that is toward the front 33 and therefore serve as circuit terminals, being spaced a suitable distance apart near opposite sides of the casing 23, one contact device being connected by a wire 44 having insulation 45 thereon and extending through the boss 29 to the battery 9, the other contact device being connected by a wire 46 having insulation 47 thereon and extending also through the boss 29 to the magneto 11.

A flexible casing 48 is provided which is preferably composed of one or more close coils of wire extending around and covering the insulation 45 and 47 of the circuit wires and extending into the boss 29 in which it is secured by solder 49, the casing 48 extending in an exposed situation near the dash-board 2 down to and along the frame 1 to which it is grounded by supporting-clips as 50 and 50', the casing 48 serving admirably as an armor for the circuit-wires which in many cases lead through or in almost inaccessible places. It will be clear that under ordinary circumstances it would be practically impossible to destroy the ground connection of the casing 48 and therefore the casing or housing 23 is constantly grounded by means of the casing 48, 51 indicating a ground connection equivalent to the clips 50 or 50'.

A shaft 52 is mounted rotatively in the guide 36 and is movable longitudinally therein, the inner end of the shaft having a switch blade 53 secured thereto which has a spring-plate 54 attached thereto that is split longitudinally from one end toward its opposite end, so as to form two contact-plates 55 and 56 that stand off slightly at their free ends from the end of the switch blade 53, to be moved into engagement with the contact devices 42 and 43 to make connection either with the battery 9 or the magneto 11. A part of the switch-blade 53 forms a projection 57 which serves to make electrical connection between the switch-blade or its shaft and a locking device, to be further described. The shaft 52 extends outward beyond the guide 36 and is provided with an operating handle-bar 58 which serves to indicate whether the switch-blade has connection with the battery 9 or the magneto 11, or whether it is disconnected from both types of electrical sources. A coil-spring 59 is arranged in the aperture 35 about the shaft and is seated against the inner end of the guide 36 and also against the switch-blade 53 to normally push the shaft 52 inward, so as to hold the contact plates 55 and 56 toward the contact devices forming the terminals of the battery circuits, the projection 57 serving the functions of a stop shoulder or locking member and a bearing member, as will hereinafter appear. A pair of stops 60 and 61 are mounted also on the plate 39 near the contact devices 42 and 43 to normally hold the contact plates of the switch-blade in engagement with the contact devices, and they serve also to hold the switch blade in mid-position when disconnected from the contact devices, as may be seen in Fig. 7. Another frame plate 62 is suitably attached to the frame-plate 39 and is composed of suitable insulating material, and if desired may be formed integrally with the plate 39, and it supports a binding post 63 that is opposite the openings 14 and 32. A circuit-wire 64 is connected to either one of the screws 38 at the inner side of the front 33 and is connected also to the binding post 63, and a circuit-wire 65 is connected to the binding post 63 and also to the binding post 19 which is connected by a wire 16' with the primary winding 16 of the spark-coil, so that, as will be seen, a circuit may be established between either the battery 9 or the magneto 11 through the switch-blade 53, the shaft 52, the guide 36, and the circuit-wires 64 and 65 with the spark-coil. The wire 64 preferably extends through the frame-plate 62.

It will be clear, of course, that the circuit may be broken by means of the switch-blade when moved to mid-position and, therefore from contact with both of the contact devices 42 and 43, but it is free to be moved into contact with either one of the contact devices; and it is clear that in some cases one battery only may be desired, and while in such case the switch blade 53 might be held in permanent contact with the single battery it is preferable that it be disconnected therefrom, but that it be free to be moved into contact or out of contact therewith.

In order to positively prevent the making of the circuit after having been broken and also to provide an additional safeguard against any unauthorized person making a temporary circuit, provision is made for automatically locking the circuit breaking devices and grounding the circuit when the circuit is intentionally broken, and as a simple means for such purposes a suitable lock-case 66 is mounted on the inner side of the front 33 and preferably in connection with the frame-plate 62, and it has a lock-bolt 67 mounted therein preferably slidingly as illustrated, the end of the lock-bolt being preferably beveled as ordinarily made, and arranged so as to be in proximity to the projection 57 which has a rounded face presented toward the lock-bolt, a spring 68 being mounted in the lock-case and normally projecting the lock-bolt toward the shaft 52 and the projection 57. An electrical connection is made between the lock-case 66 and the back 24 of the casing or housing by a suitable wiring, such as a coil-spring 69 and a binding-screw 70 or a wire 69', and a binding-screw 70'. The outer end of the lock-bolt 67 preferably has an insulating-plate 71 attached thereto that normally rests against the projection 57 when the shaft 52 is pushed inward so that the switch-blade may be in operative position; or in some cases the insulating-plate 71 may be omitted and the lock-bolt be arranged, so as to be near but not in contact with the projection 57, as in Fig. 16, the result in either case being that electrical connection or direct contact is prevented between the lock-bolt and the switch-blade or the projection 57 formed practically as a part thereof. The lock-bolt preferably has a spring tongue 72 mounted thereon that is adapted to insure contact of the lock-bolt with the projection 57 at the proper time, being designed to compensate for possible lost motion of the several parts in their mountings. A housing 73 forms a part of the lock-case 66, being attached thereto, and extends through the front 33, a barrel 74 being mounted rotatively in the housing and normally locked to prevent rotation by means of sectional pins 75 pressed by springs 76, all of well known construction, the pins being manipulated by a peculiar key 77 inserted in the barrel and engaging the pins, as will be understood, the barrel carrying an arm 78 for retracting the lock-bolt 67. It will be understood that each proprietor may have a special key that ordinarily could not be duplicated, so that there would be little likelihood of others being able to operate the lock to retract the lock-bolt. When it is desired to break the circuit and lock the circuit breaking devices and also to ground the circuit, the shaft 52 is drawn out until the projection 57 passes to the outer side of the lock-bolt and permits the lock-bolt to be projected beyond the extremity of the projection 57, so that the lock bolt and also the tongue 72 will engage the projection 57 and make direct connection therewith and also prevent the shaft 52 from being again moved inward, and also prevent connection of the switch-blade 53 with either one of the batteries, the contact plates 55 and 56 being moved sufficiently far away from the plane of the contact devices 42 and 43 to prevent contact therewith even though the shaft 52 be turned rotatively in its guide.

In some cases the lock-bolt 67 may be prevented from normally contacting with the projection 57 by applying an insulator 79 to the projection 57 instead of providing the lock-bolt with an insulator, and in such cases the lock-bolt may be projected directly into contact with the insulator 79, and it is preferable to provide the shaft 52 with a spring-tongue 80 adapted to engage the lock-bolt to insure contact between the lock-bolt and the projection 57 when the shaft 52 is drawn outward to ground the circuit as shown in Fig. 14.

It will be understood that the grounding devices may be variously modified, and one example is illustrated in Fig. 17, in which the circuit-wire 65 is connected to a wire 81 that is connected to the binding-post 19 and also to a binding-post 82 mounted on the spark-coil box 13, and a circuit-wire 83 is connected to the binding post 82, the wire 83 being connected to a wire 84 that is connected with the battery 9, the wire 83 being connected also to a wire 85 that is connected to the magneto 11. A circuit-wire 86 is connected to the lock-case 66 and preferably extends through the frame-plate 62 and is connected to the binding-post 63, making connection of the primary winding with the lock-case. A circuit-wire 87 is connected with either one of the screws 38 and is connected also with the back 24 by means of a binding-screw 88, so that the casing 23 and therefore the casing 48 is in connection with the guide 36 and therefore with the switch-blade 53 and also the projection 57. When the lock-bolt 67 is not in contact with the projection 57 it will be understood therefore that the sparking-circuit will be established and that when the shaft 52 is drawn outward and locked in engagement with the lock-bolt the circuit will be grounded and sparking prevented.
In practical operation, the shaft 52 is unlocked and may be turned to switch into connection either with the battery 9 or the magneto 11 and may be drawn out longitudinally to prevent connection with either battery or magneto and will be engaged and securely locked by the lock-bolt whereby the circuit will be grounded. When the lock-bolt 67 and the projection 57 are arranged relatively as shown in Fig. 16, of course the outward movement of the shaft 52 will cause the projection 57 to engage the beveled side of the lock-bolt and retract the lock-bolt while the projection 57 passes by to the outer side of the lock-bolt or into engagement with the tongue 72, after which the lock-bolt will be automatically projected by its spring. When it is desired to establish the electrical circuit it is necessary only to insert the key 77 into the barrel 74 and slightly turn the key, which will retract the lock-bolt and permit the spring 59 to force the shaft 52 inward, so as to be disengaged from the lock-bolt and in position to be moved into connection with the battery-circuit by means of the switch-blade 53 and the contact devices.

Having thus described the invention, what is claimed as new, is—

1. An electrical circuit-breaker including an electrical current-conducting circuit, movable electrical conducting connector for forming the normal circuit, and a movable locking device acting directly with the connector to ground the circuit and also to prevent restoration of the normal circuit when grounded.

2. An electrical circuit-breaker including two separate electrical conducting elements, a grounding connection, a movable conducting connector for the two conducting elements, and a retractable locking device acting to hold the connector when in contact therewith and acting also to ground the connector with the grounding connection.

3. An electrical circuit-breaker including two separate electrical conducting elements, a grounding connection, a movable conducting connector for connecting or disconnecting the two conducting elements, and a retractable locking device acting to hold the connector when in contact therewith and acting also to ground the connector with the grounding connection when the connector disconnects the two conducting elements.

4. An electrical circuit-breaker including two separate electrical conducting elements, a movable conducting connector for connecting or disconnecting the two conducting elements in or from an electrical circuit, a locking device acting to hold the connector when the connector is moved to disconnect the two conducting elements, and means including the locking device for grounding the circuit when the conducting elements are disconnected by the connector.

5. An electrical circuit-breaker including two separate electrical conducting elements, a conducting connector normally connecting the two elements and movable to break the circuit, and a movable locking device having a circuit-wire operatively connected therewith, the locking device acting to hold the connector when the circuit is broken thereby and acting also directly with the connector and the circuit wire to form ground connection when holding the connector.

6. An electrical circuit-breaker including a housing, a contact device mounted in the housing, a circuit-wire connected to the contact device and extending out through the housing, a conducting connector mounted movably in the housing to be moved into or out of connection with the contact device, a movable conducting locking device mounted in the housing to hold the connector when moved out of connection with the contact device, an electrical conducting element in the housing to form electrical circuit through the locking device with the connector, and an insulator automatically interposed between the connector and the locking device when the connector is moved into connection with the contact device.

7. An electrical circuit-breaker including a housing, a contact device mounted in the housing, a circuit-wire connected to the contact device, a hollow guide mounted on the housing, a circuit-wire connected with the guide, a shaft mounted in the guide to move longitudinally, a connector on the inner end of the shaft and movable thereby into or out of connection with the contact device, a lock-bolt mounted in the housing and movable into or out of contact with the connector when the connector is out of connection with the contact device and having an elastic tongue thereon to also engage the connector, and a circuit-wire in operative connection with the lock-bolt.

8. An electrical circuit-breaker including an inclosing metallic housing with an insulating front, an insulating frame plate in the housing, two contact devices mounted on the frame plate, a hollow guide mounted on the front, a shaft mounted movably in the guide and having a switch-blade and connector combined and also a projection thereon, the switch-blade and connector being movable into or out of connection with either one of the contact devices, a lock-bolt mounted in the housing and projectable to engage the projection when the switch-blade and connector is disconnected from both of the contact devices, separate circuit-wires connected with the contact devices separately, and a circuit-wire in operative connection with the switch-blade and connector combined.

9. An electrical circuit-breaker including a stationary electrical contact element with a battery-wire connected thereto, two electrical conducting devices normally held electrically apart and movable into engagement one with the other electrically, one of the two conducting devices being movable into or out of electrical connection with the contact element, the remaining one of the two conducting devices acting to hold the other one of the two devices when out of electrical connection with the contact element and provided with positive locking means, one of the two conducting devices having a spark-coil primary-wire electrically connected therewith, the other one of the two conducting devices having a ground wire electrically connected therewith, and means for retracting the locking means.

In testimony whereof, we affix our signatures in presence of two witnesses.

WILLIAM F. WOCHER.
ROBT. L. LEMON.
LOUIS H. MORTSOLF.

Witnesses:
  E. BAUER,
  BERNICE W. GROSS.